United States Patent [19]

Manning et al.

[11] Patent Number: 4,514,775
[45] Date of Patent: Apr. 30, 1985

[54] STREAMING CASSETTE TAPE TRANSPORT

[75] Inventors: George H. Manning, Nashua; Pasquale R. Riccio, Salem, both of N.H.

[73] Assignee: MFE Corporation, Salem, N.H.

[21] Appl. No.: 374,046

[22] Filed: May 3, 1982

[51] Int. Cl.³ .................. G11B 15/66; G11B 21/08; G11B 5/55

[52] U.S. Cl. .................. 360/96.6; 360/106

[58] Field of Search .................. 360/96.6, 106

[56] References Cited

U.S. PATENT DOCUMENTS

| | | | |
|---|---|---|---|
| 3,592,068 | 7/1971 | Yamada | 360/106 |
| 3,676,609 | 7/1972 | Coyle et al. | 360/106 |
| 4,208,681 | 6/1980 | Hatchett | 360/96.6 |
| 4,374,401 | 2/1983 | Takai | 360/96.6 |

FOREIGN PATENT DOCUMENTS

| | | |
|---|---|---|
| 1302491 | 1/1973 | United Kingdom . |
| 1371671 | 10/1974 | United Kingdom . |
| 1506778 | 4/1978 | United Kingdom . |
| 2020081 | 11/1979 | United Kingdom . |
| 1578103 | 10/1980 | United Kingdom . |

Primary Examiner—Robert S. Tupper
Attorney, Agent, or Firm—Cesari and McKenna

[57] ABSTRACT

A cassette tape transport has a base for supporting the transport's head assembly and drive motors which is tilted appreciably relative to the transport's front plate through which the cassette is loaded into the transport. The unit also includes a cassette holder with a retractable slider and which is swingable relative to the base between a loading position wherein it is aligned with the slot and defines, with the base and plate slot, a right triangle and an operating position wherein it lies adjacent the base so as to position the cassette therein accurately relative to the head assembly.

The head assembly can be operated to move the head toward and away from the base against which the cassette is supported by the holder between fixed positions so that the transport can write on and read from a plurality of parallel tracks along the cassette tape. The entire unit can fit within the standard size opening of a small computer system designed to receive a standard 5¼ inches Winchester disk drive and be used as a back-up memory in lieu of that drive.

6 Claims, 9 Drawing Figures

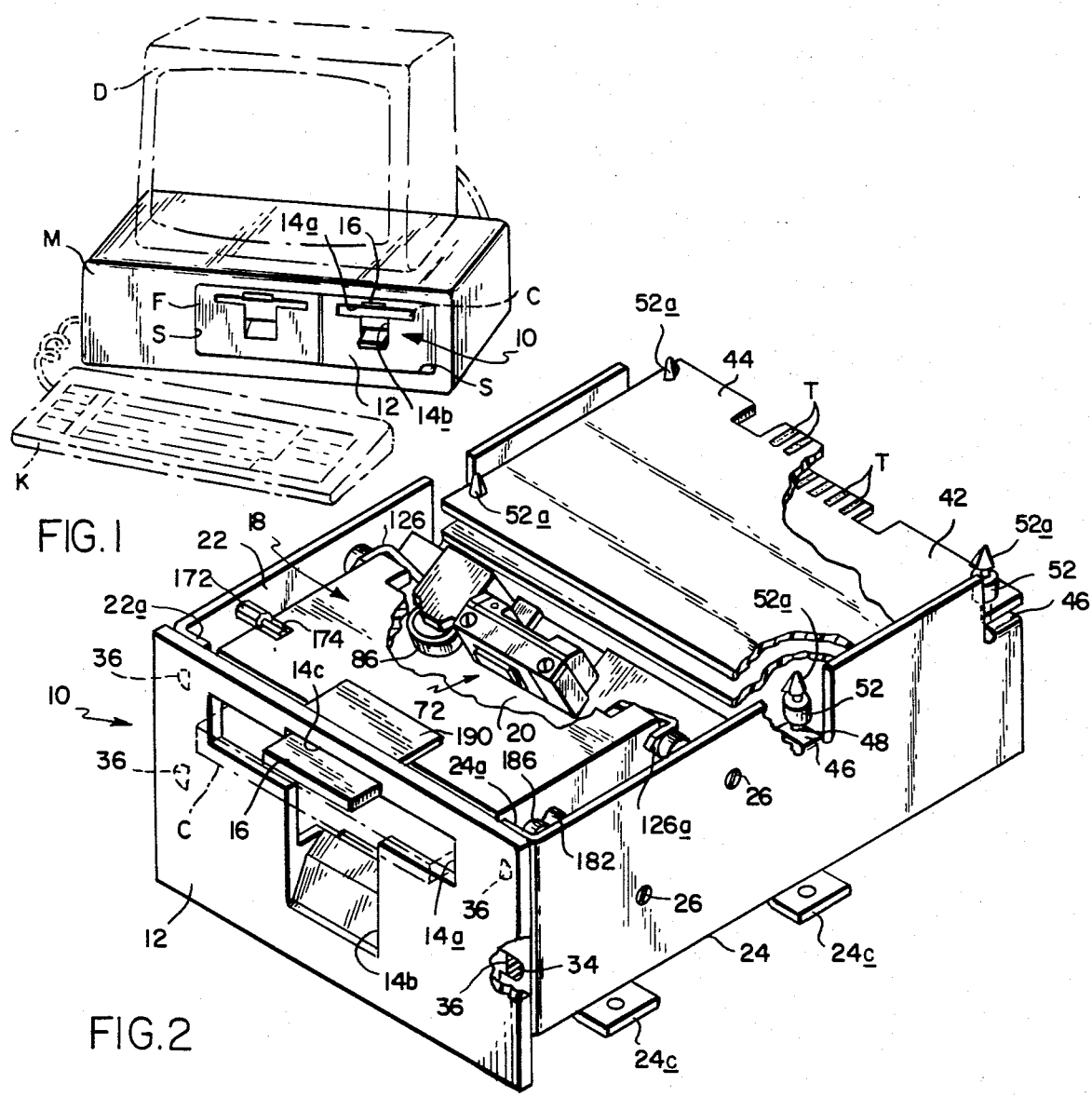
FIG.1
FIG.2
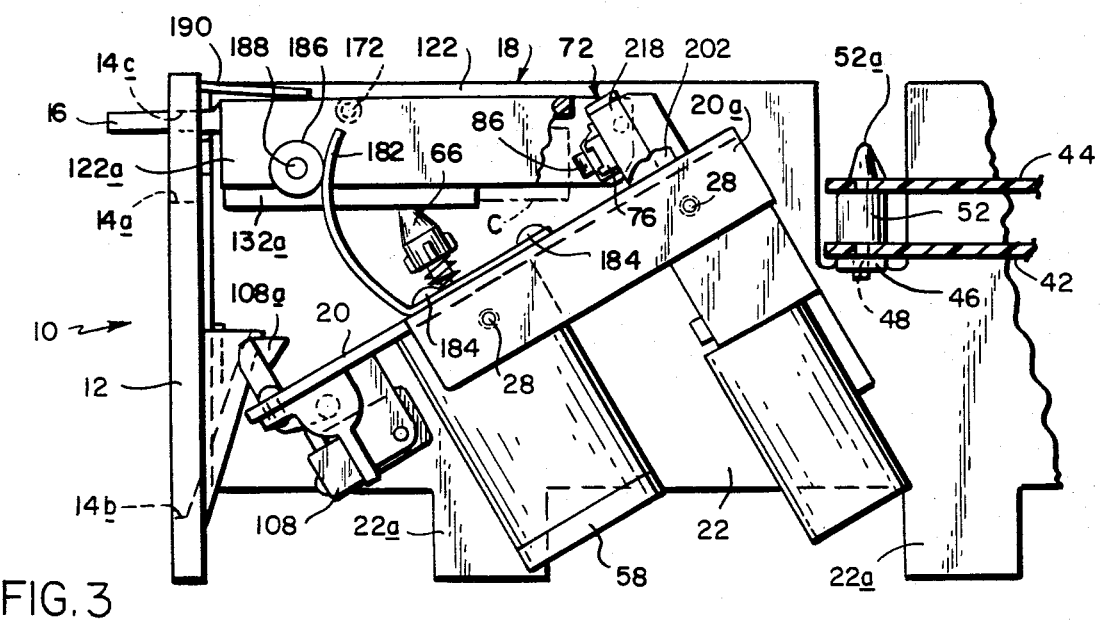
FIG.3

STREAMING CASSETTE TAPE TRANSPORT

This invention relates to a cassette tape transport. It relates more particularly to a transport of this type which winds the cassette tape back and forth continuously and at high speed while recording and retrieving data from the tape.

BACKGROUND OF THE INVENTION

Present day small computers of the personal and business type commonly include a microprocessor, a keyboard and a video display screen or CRT. One can program the computer to process information entered into the system via the keyboard for display on the CRT. Since the processor usually has only a limited amount of memory, as the user's requirements increase, additional memory capacity is connected to the system.

In several of the present day small computers, including those marketed under the trademarks IBM, TRS and APPLE, the added memory component is a minifloppy disk ($5\frac{1}{4}''$ diskette) drive. The requirement for higher capacity evolved a $5\frac{1}{4}$ inches Winchester drive which stores the data on a rigid disk. Through custom and usage, these drives have become standards in the industry for such small computer systems. Each is invariably contained in a compact generally rectangular package which is on the order of eight inches long, six inches wide and three one-quarter inches high and it fits in a standard size slot either in the computer terminal itself or in a separate housing associated with the terminal.

Also, it is customary in systems of this type to provide memory redundancy. That is, in addition to a working Winchester disk drive, for example, a second or back-up memory is provided for archival purposes. Information that is stored in the working memory is also stored simultaneously in the back-up memory which is intended to be retained in a secure place for a prolonged period for record keeping purposes.

In the past, some have attempted to store the archival information on a floppy disk. However, in the present state of the art, such disks and their associated drives do not have the capacity to back up the quantity of information stored on current and future $5\frac{1}{4}$ inches Winchester disks. Accordingly, in many cases, the practice has been to utilize a second Winchester disk drive as the back-up memory. This, however, has turned out to be a relatively expensive practice.

SUMMARY OF THE INVENTION

Accordingly, it is an object of the present invention to provide a cassette-tape transport particularly suited for use as a back-up memory in present day small computer systems.

Another object of the invention is to provide such a transport which can form factor replace the $5\frac{1}{4}$ inches floppy or Winchester disk drive at the same location in the computer terminal or in an ancillary housing.

Another object is to back up the entire content of the $5\frac{1}{4}$ inches Winchester disk on a single cassette and consequently eliminate the inconvenience and cost of multiple media changes during back up.

A further object of the invention is to provide a back-up memory in the form of a cassette tape transport which is more accurate and reliable than, and which can store more information than, a floppy disk drive memory formerly used to provide memory redundancy.

Still another object of the invention is to provide such a back-up memory which is more compact and easier to store than a Winchester disk drive memory used to provide memory redundancy.

Another object of the invention is to provide a cassette tape transport having a rapid search capability.

Yet another object is to provide a transport of this type which is relatively simple and easy to maintain.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, as a back-up memory we use a standard digital magnetic tape cassette and a special streaming cassette tape transport which drives the tape in the cassette back and forth continuously at high speed while recording on, and retrieving data from, the tape. The tape transport is designed so that, using a single head, it can record data on and retrieve data from a plurality of tracks on the magnetic tape in the cassette. Accordingly, the transport can store a relatively large amount of data.

Since the data is stored on the tape of a standard size cassette, that memory mechanism can be transported to and from a storage location easily and safely. For the same reason, a large amount of data can be retained for a prolonged period in a relatively small amount of storage space. The present transport can serve as a back-up memory which is more reliable than a floppy disk memory and is much less expensive than a rigid disk system. Furthermore, it can be substituted for a $5\frac{1}{4}$ inches Winchester drive or floppy disk drive at exactly the same mounting location in the computer system.

This can be accomplished mainly because the major components of the transport including the read/write head and drive motors are supported on a stationary base which is slanted relative to the cassette-receiving slot at the front of the transport. The transport includes a cassette holder pivotally mounted to the base which, in its loading position, is aligned with that slot so that it can receive a cassette. The holder is movable to an operating position against the slanted base so as to position the cassette very precisely relative to the base and head. The head is shiftable upon command toward and away from the base so that it can record data on the tape on different tracks at any location therealong and likewise it can operate in a rapid search mode to read data from those locations.

While the transport is especially useful as a back-up memory, it can be used in many applications requiring a memory having a rapid search capability.

BRIEF DESCRIPTION OF THE DRAWINGS

For a fuller understanding of the nature and objects of the invention, reference should be had to the following detailed description, taken in connection with the accompanying drawings, in which:

FIG. 1 is a perspective view illustrating a typical small computer with a back-up memory in the form of a streaming cassette tape transport made in accordance with this invention;

FIG. 2 is a perspective view with parts broken away on a much larger scale illustrating the transport in greater detail with the transport being shown in its open position;

FIG. 3 is a fragmentary side elevational view on a still larger scale with parts broken away of the FIG. 2 transport;

DESCRIPTION OF THE PREFERRED EMBODIMENT

Figure 4:
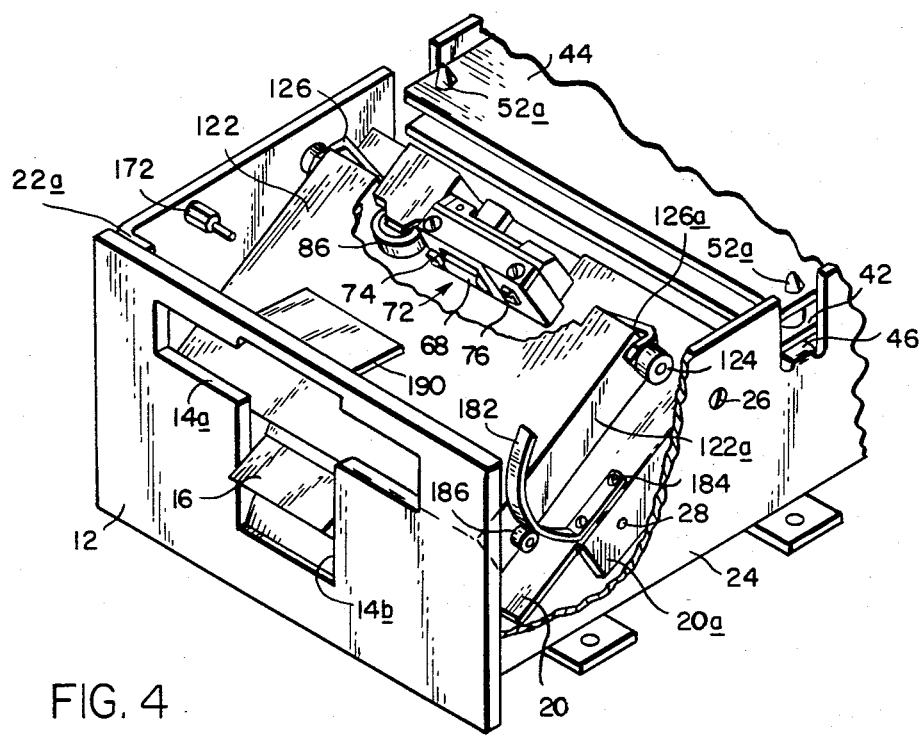
FIG. 4 is a perspective view similar to FIG. 2 showing the transport in its closed position.

Referring to FIG. 1 of the drawings, there is shown there a typical small computer system including a so-called intelligent terminal D which has its own microprocessor. The terminal is shown resting on a memory unit M in front of which is positioned a typical keyboard K. These three units are electrically connected together so that, by manipulating the keys of the keyboard, one can cause the microprocessor in the terminal to perform certain programmed functions with the results being displayed on the screen of the terminal D.

The memory unit M contains a pair of side-by-side recesses S. Positioned in the left-hand recess is a standard floppy disk drive unit F which is the working memory for the illustrated computer system. It could just as well be a standard Winchester drive. Positioned in the right-hand recess S in lieu of a standard 5¼ inches Winchester disk drive is a back-up memory system made in accordance with this invention and shown generally at 10. System 10 has the same shape and dimensions as the Winchester drive enabling it to fit in the very same recess S without any modification or enlargement of that opening. While the illustrated recesses are horizontal, in some computers they might be turned 90°.

System 10 comprises a front panel 12 which is compatible from a design standpoint with the corresponding front panel of the floppy disk drive unit F. Formed in panel 12 near the upper edge thereof is a horizontal slot 14a for receiving a standard size digital magnetic tape cassette C. A second slot 14b depends from slot 14a with a small segment 14c above slot 14a, the two slots forming the letter T. A handle 16 is movable in the slot 14b so as to move the cassette C from its loading position shown in FIGS. 1 and 3 to its operating position shown in FIGS. 4 and 5 as will be described later.

The system 10 is a front-loading system in which the cassette C is readily accessible at the front of the memory unit M. As will be described in detail later, a relatively large amount of data can be recorded on the tape in the cassette. Thus, the cassette can serve as a convenient back-up memory, receiving the same data being recorded by the floppy disk drive unit F. Then the cassette can be removed easily from the memory unit and stored at a convenient location so that the data is always available should it be needed. Clearly, the maintaining of stored information for record purposes on a cassette such as cassette C is much more convenient than maintaining that data on the disk or disks in a Winchester drive as is being done presently.

Referring now to FIGS. 2 and 3, the system 10 comprises, in addition to the cassette C, a cassette tape transport shown generally at 18. The tape transport includes a base plate 20 having a pair of opposite depending side flanges 20a. The base plate 20 is secured between a pair of similar left- and right-hand side plates 22 and 24. Small screws 26 extending through holes in those side plates are turned down into threaded holes 28 in the plate flanges so as to clamp the base plate between the two side plates. As best seen in FIGS. 3 and 4, the screw holes in the side plates for the screws 26 are positioned so that, when those plates are more or less horizontal, the base plate 20 is slanted at a substantial acute angle downwardly-forwardly relative to the longitudinal axes of those plates.

The front plate 12 referred to above is connected to the forward edges of plates 22 and 24. For this, those plates are provided with inwardly turned flanges 22a and 24a at their forward ends and each flange is formed with upper and lower keyholes or slots 34 extending inward from the free edge of the flange. Projecting from the rear face of the base plate 12 are four keys 36 which register with the keyholes 34. After securing one of the two side plates, say plate 24, to the base plate 20, the front plate 12 is engaged to that assembled side plate by inserting its keys 36 into the plate 24 keyholes 34. Then the remaining side plate 22 is assembled by engaging its flange keyholes or slots 34 onto the keys 36 at the other side of the front plate and then attaching that plate to the other base plate flange 20a using screws 26.

The side plates 22 and 24 extend rearwardly beyond the base plate 20 and support a pair of printed circuit boards 42 and 44. A pair of spaced-apart tongues or tabs 46 are formed at the upper edges of the plates, with the tabs in the two plates projecting toward one another. Each tab 46 contains a threaded hole 48. The lower printed circuit board 42 rests on these tabs and is secured there by threaded fasteners 52 which extend through appropriate openings in the printed circuit board and are turned down into the holes 48. Each fastener 52 contains a raised clip 52a and these clips engage in openings in the upper circuit board 44 to retain that circuit board to the transport as best seen in FIG. 3.

The printed circuit boards 42 and 44 contain edge terminals T which are engaged by electrical connectors (not shown) to the other components of the computer system illustrated in FIG. 1.

Obviously also, electrical connections (not shown) exist between the printed circuit boards and the various electrical components of the transport 18 to be described. Since these connections are quite conventional, they are not detailed in this description. Tabs 22c and 24c are provided at the lower edges of plates 22 and 24 to anchor the system 10 in the recess S of memory unit M (FIG. 1), if desired.

Figure 7:
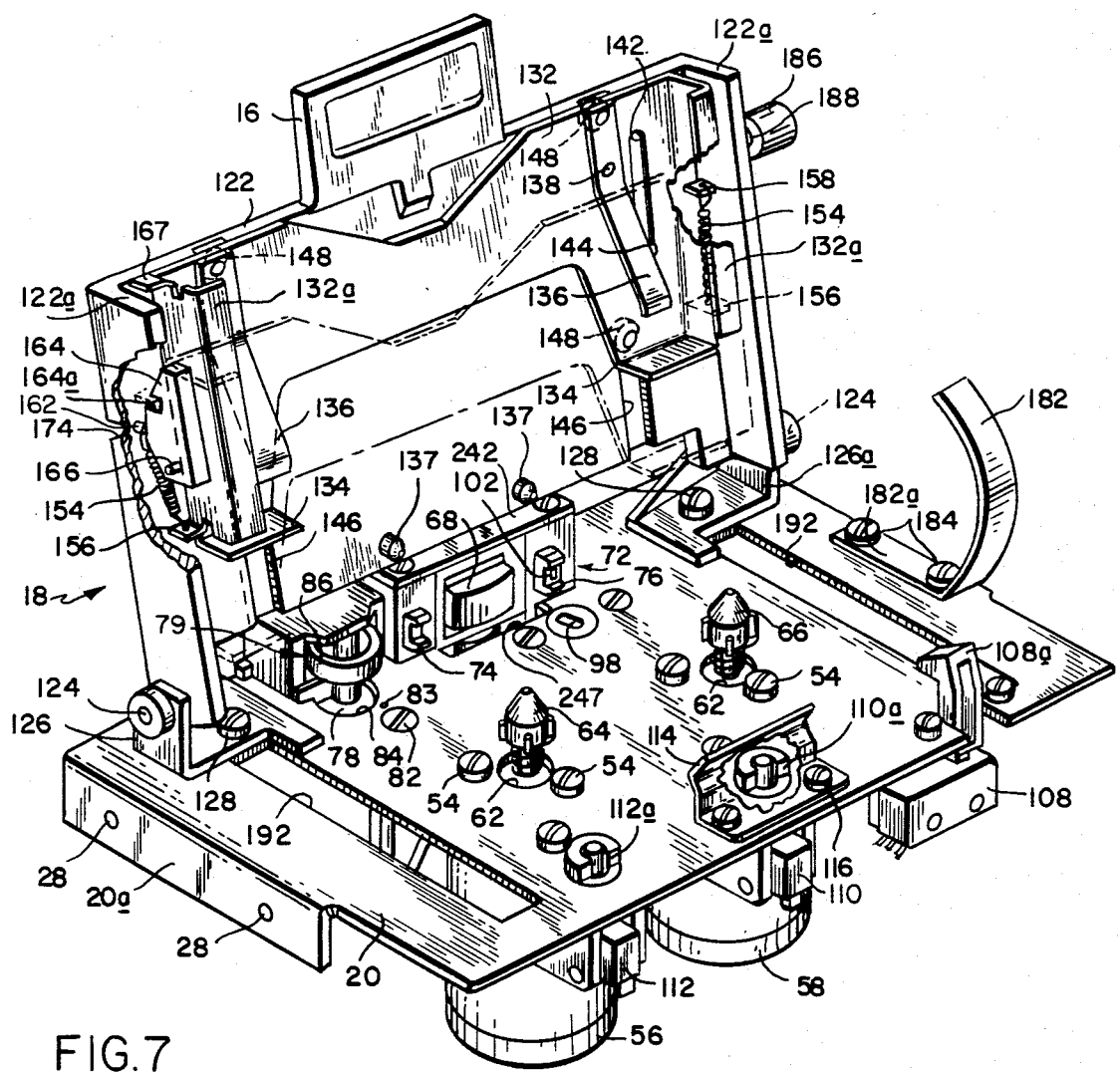
FIG. 7 is a perspective view with parts broken away on a still larger scale showing the major interior components of the transport.

Refer now to FIGS. 3 and 7, the latter of which shows the transport 18 partially disassembled and opened up. Mounted to the underside of plate 20 by screws 54 are a pair of spindle drive motors 56 and 58. The motor armatures project up through appropriate openings 62 in the plate and are terminated by standard spring-loaded spindles 64 and 66 respectively. Juxtaposed to those spindles is a more or less standard magnetic read/write head 68. Head 68 is mounted in a special assembly shown generally at 72 that will be described in detail later which enables the head to write on and read from a plurality of tracks on the tape in cassette C. Suffice it to say at this point that the head 68 is positioned relative to the spindles in the same way as in any standard cassette tape transport. Also, as in prior such transports, the assembly 72 is provided with tape guides 74 and 76 on opposite sides of the head 68 for guiding tape from the cassette tape reels past the head. The guides fit in openings in the leading edge of cassette C which are standard in cassettes of this type.

The illustrated transport is of the direct drive type. In other words, the transport does not move the tape in the cassette by means of a capstan. Rather, it drives the cassette tape reels directly by way of the drive motors 56 and 58. Tape speed is monitored by a tachometer 78 in a slotted tachometer assembly 79 which engages on the rear edge of plate 20 adjacent assembly 72. The assembly 79 is retained there by a screw 82 extending down through the plate into the assembly and a locating pin 83 projecting up from the assembly thorugh the plate. The tachometer armature projects up through an opening 84 in plate 20 and carries a rubber wheel 86. In use, the periphery of the wheel 86 engages the tape in the cassette through an opening in the leading edge of the cassette. Therefore, as the tape moves, the tachometer generates electrical pulses which are processed by the electronics on the printed circuit boards 42 and 44 and used to control the speed and direction of motors 56 and 58 as is well known in the art.

Figure 8:
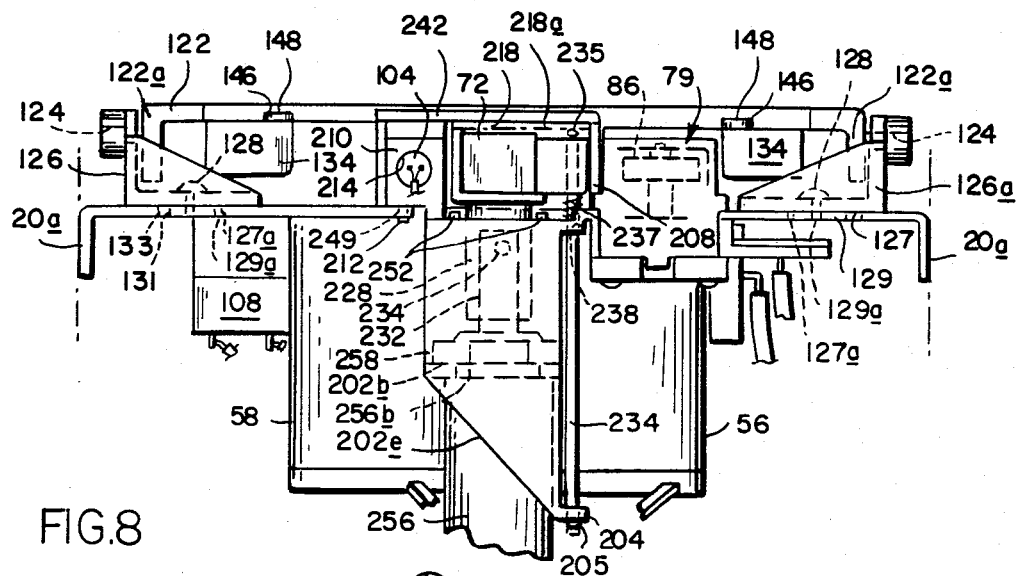
FIG. 8 is a fragmentary rear elevational view thereof.

Still referring to FIG. 7, the present transport, like many others presently in use, includes and end-of-tape sensor. More particularly, light from a bulb 92 (FIG. 6) mounted to the underside of the plate shines through an opening 98 in the plate just in front of tape guide 76. When a cassette C is seated in the transport, standard openings in the two faces of the cassette adjacent their leading edges are situated opposite opening 98. Also, a segment at each end of the tape in the cassette C is transparent so that at end of tape, light from bulb 92 can shine through the cassette face into a passage 102 in the tape guide 76 projecting into the leading edge of the cassette. Passage 102 extends through the assembly 72 to a light sensor such as a photodiode 104 (FIG. 8). The diode senses that light and initiates an electrical signal which causes tape reversal and other transport functions to be performed.

Various microswitches are mounted to the base plate 20 adjacent the forward edge thereof. These include a switch 108 which prevents the tape in cassette C from being recorded on and thereby erased inadvertently. The switch 108 includes a finger 108a which projects up through the plate 20 and engages the trailing edge of the cassette. That switch is open or closed depending upon whether the usual knock-out tab on the cassette is present. Positioned to the left of switch 108 is a switch 110 which detects whether side 1 or side 2 is being operated on by the transport. To the left of switch 108 is a third switch 112 which senses when a cassette is properly seated in the transport for a read or write operation. Switches 110 and 112 have platforms 110a and 112a which projects up through plate 20 and establish the proper position of the trailing edge of the cassette against plate 20.

A spring clip 114 mounted by screws 116 to plate 20 just in front of switch 110 engages the near edge of the cassette for urging the cassette toward head 68 as will be described later. All of the switches 108, 110 and 112 are connected to the electronic components on the printed circuit boards 42 and 44 so that they can perform their appropriate functions. The construction and operation of these switches is conventional and will not be detailed here.

Figure 5:
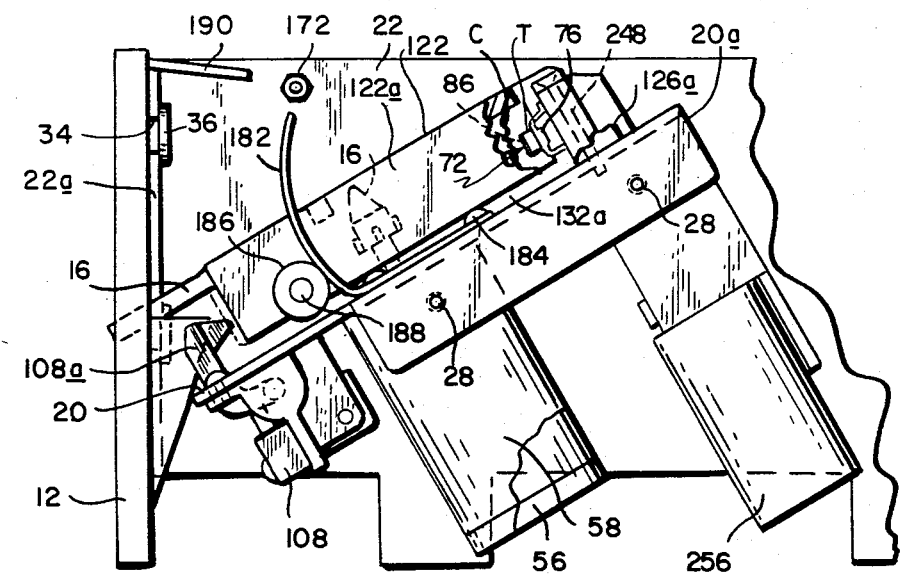
FIG. 5 is a fragmentary side elevational view with parts broken away of the FIG. 4 transport.

Still referring to FIG. 7, the cassette C is retained in the transport 18 by a generally rectangular cassette holder 122. The holder 122 has a pair of side flanges 122a which are pivotally connected at their rear corners by laterally extending shafts 124 to a pair of generally L-shaped brackets 126 and 126a anchored by screws 128 adjacent to the rear corners of the base plate 20. Thus, the holder can swing relative to plate 20 between an open or loading position away from the plate as shown in FIGS. 2 and 3 and a closed or operating position against the plate as shown in FIGS. 4 and 5.

Unlike the usual situation, in the present transport, the head 68 is mounted to the tilted base, while the cassette is held by a separate holder 122 swingably secured to the base. Since the relative position of the cassette and head is critical, particularly if the transport is to record data on a plurality of tracks on the tape in the cassette, special care is taken here to insure that the holder is positioned properly on the base without unduly complicating the assembly of the transport.

Figure 6:
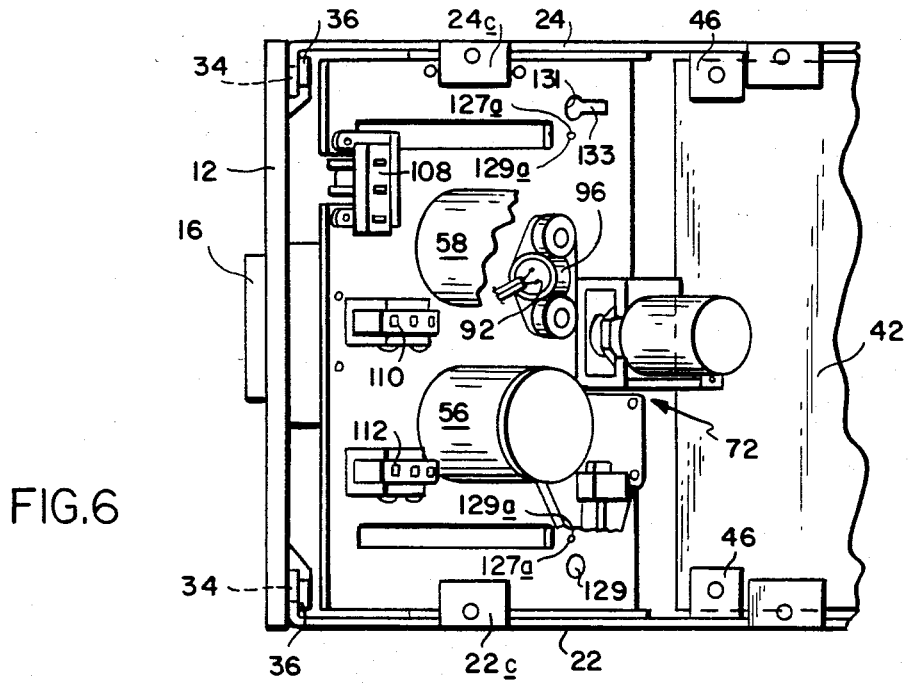
FIG. 6 is a fragmentary bottom plan view of the transport.

More particularly and as shown in FIGS. 6 to 8, the left-hand bracket 126 has a cylindrical boss 127 and a smaller cylindrical post 127a projecting from its bottom wall which fits snugly into openings 129 and 129a respectively in plate 20. The right-hand bracket 126a also has a depending post 127a which fits in an opening 129a in the plate. However, instead of a boss 127, it has a depending key 131 which engages and locks in a keyhole 133 in the plate. To assemble the holder to the base, the bracket boss 127 is engaged in hole 129 and the holder aligned so that key 131 on bracket 126a is received in its keyhole 133. As the key is locked in the keyhole, the posts 127a seat in their respective plate holes 129a. Then the screws 128 are tightened to anchor the brackets to the plate. Actually, the left-hand post hole 129a on plate 20 is the reference point for placement of substantially all of the major components of the transport.

The handle 16 referred to in connection with FIG. 1 is in the form of a tongue which projects from the free forward edge of the holder 122.

Slidably mounted to the underside of cassette holder 122 between its side flanges 122a is a slider 132. The slider is basically a flat metal plate having a pair of side channels 132a, the distance between the two channels 132a and the channel widths are such that the cassette C can be slidably positioned in the slider. A pair of tabs 134 are provided at the rear edge thereof opposite the ends of the channels 132a which function as stops for the cassette C. A pair of leaf springs 136 are anchored by rivets 138 to the forward edge of the slider opposite the tabs 134. The free ends of the leaf springs extend toward tabs 134 and away from the holder so that, when a cassette C is inserted into the slider, the springs 136 bias the cassette toward the free edges of the slider channels 132a.

A pair of short locating pins 137 project from the underside of holder 122 at the rear thereof above tape guides 74 and 76. These accurately locate the cassette when the holder is moved to its operating position and the slider to its retracted position as will be described later.

Still referring to FIG. 7, the slider 132 is slidable between an extended position shown in solid lines in FIG. 7 and a retracted position illustrated in dotted lines in that same figure. For this, the slider 132 is formed with a pair of slots 142 just inboard of and parallel to side channels 132a (only one being shown in FIG. 7). Each slot receives a pin 144 which projects down from the underside of holder 122. The engagement of the slot ends by the pins establishes the extended and retracted positions of the slider. Washers (not shown) staked to these pins retain the slider on the holder.

In addition, a pair of grooves 146 are formed in the underside of holder 122 inboard of pins 144. Projecting into each groove 146 is a pair of buttons 148 anchored to slider 132. As the slider moves between its extended and retracted positions, the engagement of the buttons 148 against the side walls of the grooves 146 prevent the slider from cocking relative to the holder 122.

The slider 132 is biased toward its extended position shown in solid lines in FIG. 7 by a pair of springs 154 positioned between the slider channels 132a and the holder flanges 122a. Corresponding first ends of springs 154 are hooked through holes in tabs 156 projecting laterally from the rear edges of the slider channels 132a. The opposite end of the right-hand spring 154 is hooked through an ear 158 projecting inward from the right-hand holder flange 122a. The opposite end of the left-hand spring 154 engages around a pin 162 projecting out from a latch 164 which has a shaft 166 journalled in the left-hand door flange 122a. Thus the left-hand spring performs a dual function in that it helps to bias the slider 132 toward its extended position and also biases the latch 164 towards a latching position as will be described presently.

The free end of the latch 164 is formed with a notch 164a in its upper edge. When a cassette is loaded into the transport by pushing it through slot 14a in front of plate 12 as seen in FIG. 2, the slider 132 is urged toward its retracted position shown in dotted lines in FIG. 7. When a laterally extending tab 167 formed at the forward edge of the left-hand channel 132a is moved opposite the latch notch 164a, the latch engages that tab and retains the slider in that retracted position. The latch 164 is pivoted to release the slider so that the slider can extend to its solid line position shown in FIG. 7 by an actuating pin 172 (FIG. 2). Pin 172 is mounted to the left-hand side plate 22 and projects beyond the edge of holder 122 at a position to engage pin 162 through a slot 174 in the top of the holder when the holder is swung to its open or loading position shown in FIGS. 2 and 3.

The holder 122 is maintained in either its loading position shown in FIG. 3 or its operating position as shown in FIG. 5 by means of an arcuate leafspring 182 having a straight segment 182a anchored to the right-hand edge of base plate 20 by screws 184. The free end of the leafspring 182 extends up from the base plate and engages a roller 186 rotatively mounted to a shaft 188 projecting laterally from the right-hand holder flange 122a. The spring 182 is shaped so that, when the holder is swung more than half way from its open position shown in FIG. 3 toward its closed position shown in FIG. 5, the spring is overcenter on the roller 186 and urges the holder to its fully closed position, and vice versa. As best seen in FIGS. 3, 5 and 7, the slider channels 132a project down beyond the edges of the holder flanges 122a. Accordingly, a pair of slots 192 are provided in base plate 20 adjacent its side edges to provide clearance for the slider channels when the holder 132 is swung to its FIG. 5 operating position. Also, a resilient tongue 190 extending rearwardly from plate 12 just above slot 14a cushions the holder 122 when that is driven to its open position by springs 182.

As discussed above, the cassette C is loaded into the transport 18 through the slot 14a in plate 12 when the cassette holder 122 is in its loading position illustrated in FIGS. 2 and 3. As the cassette is inserted through that slot, it slides into the slider 132 overcoming the bias of the leafsprings 136 until the leading edge of the cassette engages the slider stops 134 at the rear edge thereof. As the cassette is urged further into the transport, the slider is moved toward its retracted position shown in dotted lines in FIG. 7 until the latch 164 engages the slider tab 166, thereby locking the slider and the cassette therein in that position. As the slider retracts, the cassette clears the locating pins 137 due to the downward bias of leaf springs 136. At that point, the leading edge of the cassette is disposed at an angle opposite the head assembly 72 and the tachometer wheel 86. On the other hand, the drive spindles 64 and 66 are located just below the usual sprocket holes in the cassette C as best seen in FIG. 3.

Referring now to FIGS. 4 and 5, when the holder 122 is moved to its operating position shown in these figures, the cassette C is swung against the base plate 20 so that the spindles 64 and 66 engage in the cassette sprocket holes and the trailing edge of the cassette seats on the switch pads 110a and 112a. In that position, the trailing edge of the cassette is engaged by the spring clip 114 which urges the cassette toward the head assembly 72. At the same time, the locating pins 137 projecting down from the underside of the door 122 engage in the locating holes invariably found adjacent the leading edge of a standard cassette such as cassette C. This locates the cassette precisely relative to the head assembly 72 and tachometer wheel 86. As best seen in FIG. 5, in this position of the cassette, the read/write head 68 projects through its opening in the leading edge of the cassette. Likewise, the tape guides 74 and 76 project through their openings in that edge and engage around the tape in the cassette so as to maintain the tape at the proper vertical location relative to the head. Finally, the tachometer wheel 86 projects through its opening in the leading edge of the cassette and engages the tape so that, when the tape is moving in one direction or the other, the tachometer wheel is rotated correspondingly.

During operation of the cassette tape transport, the tape drive motors 56 and 58 are operated first in one direction and then the other so as to move the entire length of tape past the head 68 first in one direction and then in the opposite direction at a very high speed, e.g. on the order of 90 to 120 inches per second, under the control of the transport electronics on the printed circuit boards 42 and 44. As directed by the system, data is recorded on or read from the continuously moving tape at the same time as that same data is written on and read from the working memory disk drive F, of the memory unit M in FIG. 1. Also, of course, when used as a working memory, the system 10 can execute rapid searches and store data just as disk drive F but more efficiently and reliably.

As noted previously, the head assembly 72 can record data on the tape on a plurality of tracks, thereby doubling the capacity of the tape memory. This is made possible because of the aforesaid construction of the transport which precisely locates the holder 122 and cassette C therein relative to the base plate 20 and the head assembly 72 supported thereby and also because of the construction of the head assembly itself to be described presently.

Figure 9:
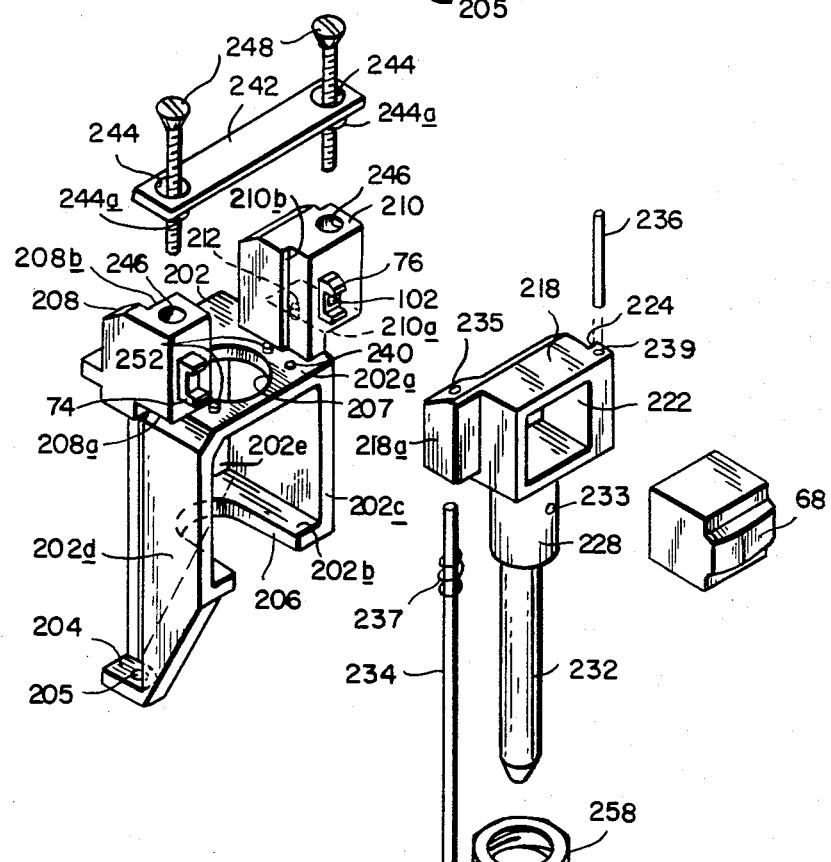
FIG. 9 is an exploded perspective view illustrating certain components of the transport in greater detail.

Referring now to FIGS. 3, 8 and 9, the head assembly 72 comprises a bracket 202 having a generally rectangular top wall 202a, a similarly shaped bottom wall 202b, a rectangular right-hand side wall 202c and a left-hand side wall 202d the latter of which extends below the bottom wall. The bracket also has a rear wall 202e which also extends below the bottom wall. The left rear corner of the bracket where the walls 202d and 202e meet is notched so as to form a small horizontal platform 204 at the bottom of that corner. A small vertical passage 205 extends through that platform for reasons that will be discussed later. A round opening 207 is present in the bracket top wall which registers with a wide slot 206 in the bracket bottom wall extending from the front of the bracket almost to the rear wall 202e thereof.

Projecting up from the bracket top wall 202a at opposite sides thereof is a pair of bosses 208 and 210. The boss 208 extends beyond the left-hand edge of the bracket top wall defining at its undersurface a very flat locating pad 208a. Also, the right rear corner of the boss 208 is notched at 208b for clearance. The tape guide 74 projects out from the front wall of that boss. The right-hand boss 210 overhangs the right side of the bracket and its undersurface forms a flat locating pad 210a. Also projecting down from that pad is a short locating pin 212 whose function will be discussed in due course. The left front corner of boss 210 is notched at 210b for clearance at that location. The tape guide 76 projects out from the front wall of boss 210 and is of course aligned with the tape guide 74. As best seen in FIG. 8, a cylindrical passage 214 extends in from the rear wall of boss 210 communicating with the passage 102 through the tape guide 76 for receiving and retaining the end-of-tape sensor 104.

Referring now to FIGS. 8 and 9, the head assembly 72 also includes a generally rectangular block 218 having a rectangular front-to-rear passage 222 which is sized to receive the read/write head 68. The head is optically aligned and permanently secured in that recess by epoxy cement or the like. Normally, the head is inserted into the head assembly 72 last so that it may be aligned properly. As seen in FIG. 9, the right rear corner of block 218 is notched at 224 for clearance. Also an integral extension 218a is formed at the left rear corner of block 218. Secured to block 218 at the underside thereof is a cap 228. Slidably received in that cap is one end of a solenoid armature 232, the armature being retained in the sleeve by a spring pin 233 extending through the side wall of the cap and engaging the armature. This cap serves as a magnetic shield to prevent magnetic flux from affecting the head or tape.

Extending parallel to the armature 232 is a long shaft 234 whose upper end is pressed or otherwise secured in a vertical passage 235 in the boss extension 218a. A shorter shaft 236 is also pressed into a hole 239 in block 218. As shown in FIG. 8, the block is assembled to the bracket 202 by inserting the armature 232 through the bracket opening 207 and bracket slot 206. A spring 237 is engaged on the shaft 234 and the shaft is inserted through an opening 238 (FIG. 8) in the bracket top wall and through the opening 205 in the bracket platform 204. The block 218 is aligned with the bracket so that the short shaft 236 passes through a hole 240 in bracket wall 202a to prevent rotation of block 218.

Once the block 218 is seated on the bracket top wall, a strap 242 is positioned on bosses 208 and 210 so that it bridges the block 218 as shown in FIG. 8. A pair of countersunk holes 244 having sleeve extensions 244a are formed at the opposite ends of the strap. The sleeve extensions 244a are arranged to seat in counterbored passages 246 in the tops of bosses 208 and 210 and the strap is cemented in place. As best seen in FIGS. 7 and 8, the head assembly 72 is then positioned in a large slot 247 formed at the rear of the base plate 20. The slot is dimensioned so that the boss locating pads 208a and 210a overhang and rest on the plate at the opposite sides of the slot, with the locating pin 212 projecting down from pad 210a being received in a registering opening 249 (FIG. 8) formed in the base plate. The assembly 72 including its strap 242 is securely anchored to the baseplate by screws 248 which extend down through strap holes 244, through the boss passages 246 and are turned down into threaded holes 249 (FIG. 8) in the base plate. Thus, assembly 72 is precisely positioned relative to plate 20, as is the cassette holder 122 as noted previously.

As best seen in FIG. 8, the block 218 is shorter than the bracket bosses 208 and 210 so that the block is vertically slidable to some degree relative to the bracket from a raised or extended position shown in solid lines in FIG. 8 and a retracted or lower position indicated in dotted lines in that same figure. The raised or extended position of the block is established by the engagement of the block against the strap 242. The lower or retracted position of the block is fixed by the engagement of the underside of the block with three short posts 252 projecting up from the bracket top wall 208a inboard of bosses 208 and 210. The block is biased toward its upper or extended position by the coil spring 237 which is compressed between the underside of the block extension 218a and the bracket top wall 202a.

The block is moved to its retracted or lower position by energizing a solenoid coil 256 having a passage 256a which receives the solenoid armature 232. The solenoid armature has a reduced diameter threaded neck 256b arranged to receive a correspondingly threaded nut 258. Prior to installing the block 218 and armature 232 on the bracket 202 and prior to assembling the bracket to the base plates as aforesaid, the solenoid neck 256b is inserted into bracket slot 206 and clamped there by nut 258.

When the transport 18 is in its operating position illustrated in FIGS. 4 and 5 and the head assembly block 218 is in its normal raised or extended position, the magnetic head 68 is located at an elevated position relative to the cassette tape. On the other hand, when the solenoid coil 256 is energized, the head 68 is moved down to a lower retracted position relative to the tape. Consequently, information can be recorded on the tape on tracks 1 and 2 in the upper position and on tracks 3 and 4 in the retracted position. The solenoid coil 256 is connected to the transport's printed circuit board 42 and controlled by the system's microprocessor and keyboard K (FIG. 1). Thus, during normal operation of the system, as the cassette tape T is traveling continuously back and forth at high speed, data can be written on or read from the tape either along an upper or a lower track thereon by appropriately energizing the solenoid coil 256. Consequently, twice as much data can be recorded on the cassette C tape than is possible using a standard tape transport. This makes the present system especially suitable as a back-up memory for a small computer system. It should be understood, however, that the present system can be used in any application in which it is desirable to be able to write and read data by a fast search of the recording medium.

Yet with all of these advantages, the present system 10 is very compact and can indeed fit in the same space customarily used to house a standard 5¼ inches Winchester disk drive.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A cassette tape transport for a standard cassette comprising
   A. a base;
   B. a generally vertical front plate, said plate
      (1) defining a cassette-receiving slot, and
      (2) being attached to the base so that it makes an acute angle with the base;
   C. a magnetic read/write head assembly fixedly mounted to the base at a location thereon spaced generally opposite the slot;
   D. cassette holding means
      (1) pivotally connected to the base so that the holding means can swing between
         (a) a loading position wherein they lie away from the base in a plane aligned generally with said slot and said head assembly and, along with the opposing surfaces of the front plate and base, define a right triangle, and
         (b) an operating position wherein the holding means lie against the base in line with said head assembly, and
      (2) including
         (a) a holder swingably connected to the base so as to be swingable between said positions;
         (b) a cassette-receiving slider slidably mounted to the holder, said slider being movable by pushing a cassette through the slot when the holder is in its said loading position between
            (i) an extended position wherein it resides adjacent to and registers with said slot, and
            (ii) a retracted position wherein it is disposed away from said slot nearer said head assembly so as to position the leading edge of the cassette against the head assembly;
         (c) means for biasing the slider toward its extended position;
         (d) means for releasably retaining the slider in its retracted position; and
         (e) means for releasing the retaining means so that the slider slides to its extended position when the holder is moved to said loading position; and
      E. means for releasably retaining the holding means in its two positions, said transport defining a spatial volume that is about 3½ by 6 by 8 inches.

2. The transport defined in claim 1 and further including
   A. a standard digital cassette; and
   B. means in the slider for slidably retaining the cassette therein.

3. The transport defined in claim 2 wherein the cassette-retaining means comprise springs mounted to the slider and engaging the cassette.

4. The transport defined in claim 1 wherein the head assembly comprises
   A. a magnetic read/write head;
   B. head-mounting means for moving the head toward and away from the base between a plurality of fixed positions in response to electrical signals; and
   C. means for providing said signals so as to enable said head to write on a plurality of parallel tracks along the tape of a cassette in the holding means.

5. The transport defined in claim 4 wherein the mounting means comprise
   A. a bracket mounted to the base;
   B. a solenoid coil mounted to the bracket;
   C. a magnetic head-retaining block slidably mounted to the bracket;
   D. a solenoid armature having one end secured to the block and having its other end extending into said coil,
   E. means for biasing the block relative to the bracket so as to movably maintain the head at one of its said positions when the coil is deenergized; and
   F. means for energizing the solenoid in response to said signals so as to move the head to another of its said positions.

6. The transport defined in claim 5 and further including means for maintaining the alignment and orientation of said block as it moves toward and away from the base.

* * * * *